United States Patent
Dahl

[15] 3,686,776
[45] Aug. 29, 1972

[54] MOTORCYCLE RIDING SIMULATOR
[72] Inventor: Christian W. Dahl, Village of Golden Valley, Minn.
[73] Assignee: Hartzell Corporation, St. Paul, Minn.
[22] Filed: April 12, 1971
[21] Appl. No.: 132,974

[52] U.S. Cl. .................................................35/11
[51] Int. Cl. ............................................G09b 9/04
[58] Field of Search ...........................35/11; 272/73

[56] References Cited

UNITED STATES PATENTS 2,805,860   9/1957   Littig ..........................272/73
3,526,042   9/1970   Nelson ..........................35/11

Primary Examiner—Wm. H. Grieb
Attorney—Stanley G. DeLaHunt et al.

[57] ABSTRACT

There is provided a motorcycle riding simulator comprising a supporting structure having crown rolls rotatably mounted thereon in longitudinally spaced parallel relation to one another for engagement with the front and rear wheels of a motorcycle to enable control and balancing of the cycle as the cycle front wheel is turned, and further having a motorcycle engaging center post swingably mounted on the supporting structure at its lower end and having a motorcycle engaging bracket pivotally attached to its upper end, the post being mounted for limited vertical movement and having means automatically controlling the downward and swinging movement thereof in accordance with the force applied to the post.

6 Claims, 4 Drawing Figures

INVENTOR
CHRISTIAN W. DAHL
BY
Stanley G. De La Hunt
ATTORNEY

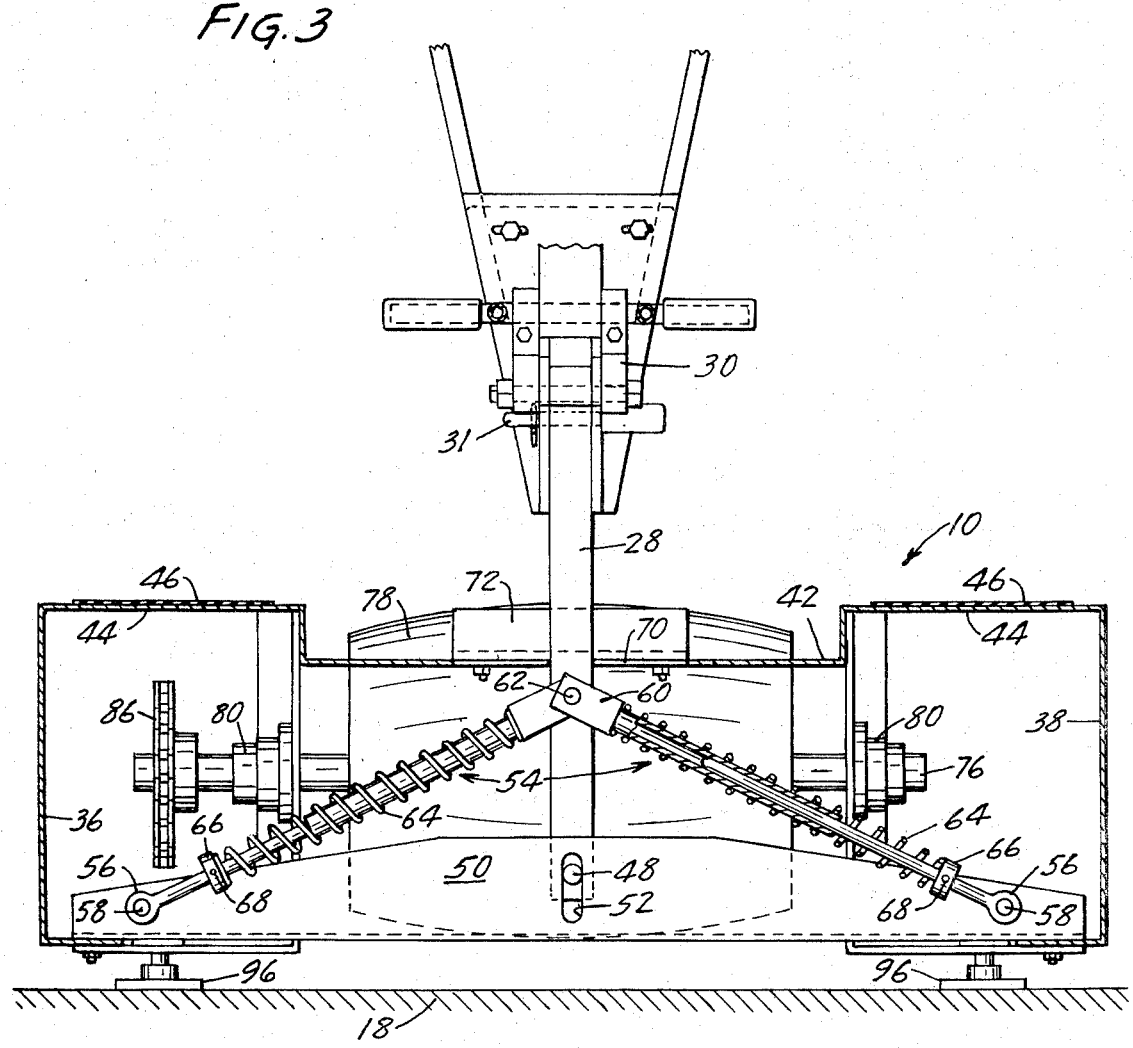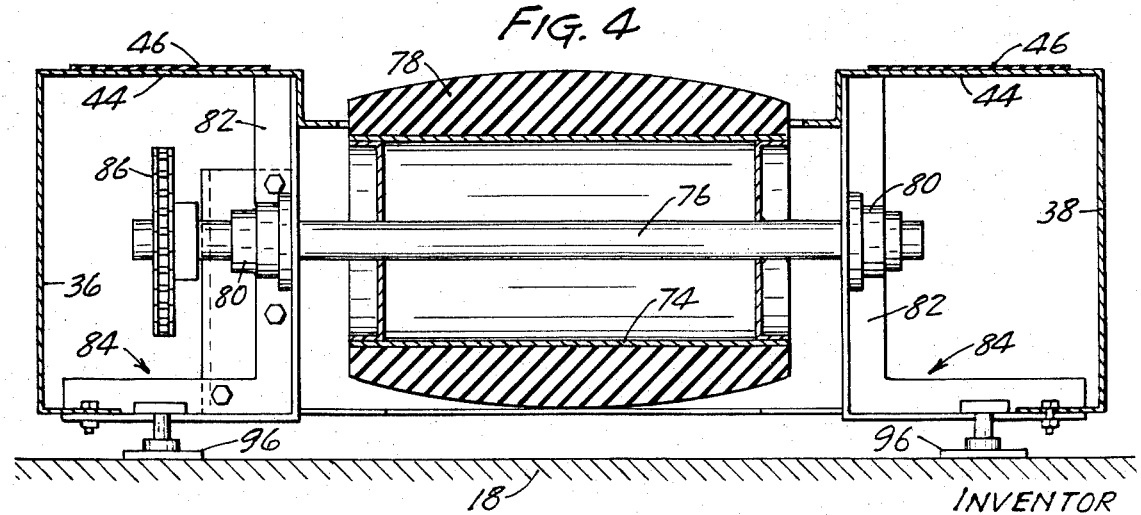

MOTORCYCLE RIDING SIMULATOR

This invention relates to a motorcycle riding simulator and more particularly relates to a motorcycle riding simulator having improved cycle supporting and motion simulating means.

The primary purpose of a motorcycle riding simulator is to provide prospective motorcycle riders with experience in the starting, stopping, steering, braking, gearshifting and sense of road feel of a motorcycle in a safe stationary environment prior to actually riding the motorcycle. By proper use of a simulator as a training device the prospective motorcycle rider is able to familiarize himself with the operations of a motorcycle under conditions wherein uncertain operation of the motorcycle controls will not result in injury to the rider or to others.

Unlike automobiles wherein driver training can be affected while the vehicle is in motion by providing the vehicle with dual controls, one set for the student and one set for the instructor, motorcycles are two-wheeled vehicles wherein any additional riders than the driver (in the absence of sidecars) must ride directly behind the driver making a dual control training system infeasible. Before the advent of motorcycle riding simulators, and still a common practice, the prospective motorcycle rider had no choice but to learn while riding the vehicle. Ofttimes, due to panic at the new sensation of a two-wheeled motorized vehicle with handlebar controls to control speed and gearshifting, motorcycle accidents involving novice riders occur.

While motorcycle simulators were known and used prior to the present invention, their use as a training aid for motorcycle riders by schools, driver safety training and examination centers, motorcycle sales centers, and similar facilities has not been widely accepted to date. A typical simulator in use prior to the present invention is one such as described in Nelson U.S. Pat. No. 3,526,042 issued Sept. 1, 1970 on an application filed Aug. 9, 1967.

While the reasons for the absence of general acceptance of the use of prior known motorcycle riding simulators are varied, it is believed that for the most part the simulators in the past had inadequate motorcycle balancing and motion simulating means to provide adequate road feel. Thus, while the student could learn to operate the controls, he was provided with inadequate means to learn proper balance, particularly in making turns, and in the use of front and rear wheel braking. Their construction was also cumbersome.

The motorcycle riding simulator of the present invention corrects many of the deficiencies present in previous simulators and provides a simple and effective cycle supporting balancing and motion simulating means which, to a great degree for a stationary simulator, simulates natural motorcycle balancing to the student, correlating the amount the bike leans from the vertical as the front wheel of the cycle is turned with the speed at which the cycle is being driven on the simulator. This new simulator also readily adjusts to riders of different weights, and provides realistic front and rear wheel braking sensations. Further, the cycle supporting means is such that it does not interfere with the mounting or dismounting of the cycle on the simulator. Further advantages of this new simulator reside in its simplicity of construction and ease of adjustment, making it readily portable and adaptable for indoor or outdoor use.

In general, the motorcycle riding simulator of this invention comprises a supporting structure having crown rolls freely rotatably mounted thereon in longitudinally spaced parallel relation to one another for engagement with the front and rear wheels of a motorcycle mounted on the simulator, and further having a motorcycle supporting center post swingably attached at its lower end to the supporting structure intermediate the crown rolls for movement transverse to a cycle carried thereby and having means on the upper end thereof for attachment to the central portion of the frame of the motorcycle. Means interconnect the intermediate portion of the cycle supporting post with the supporting structure of the simulator to normally maintain the post in an upright position while nevertheless permitting controlled swinging movement of the post in accordance with the manipulations of the cyclist using the simulator.

The invention will be described in more detail in connection with the accompanying drawing wherein:

FIG. 3 is a sectional view of the simulator taken substantially along the plane of section line 3—3 of FIG. 1 showing the cycle supporting means in detail; and FIG. 4 is a cross-sectional view taken substantially along the plane of section line 4—4 of FIG. 2 of one of the wheel engaging crown rollers of the simulator.

Figure 1:
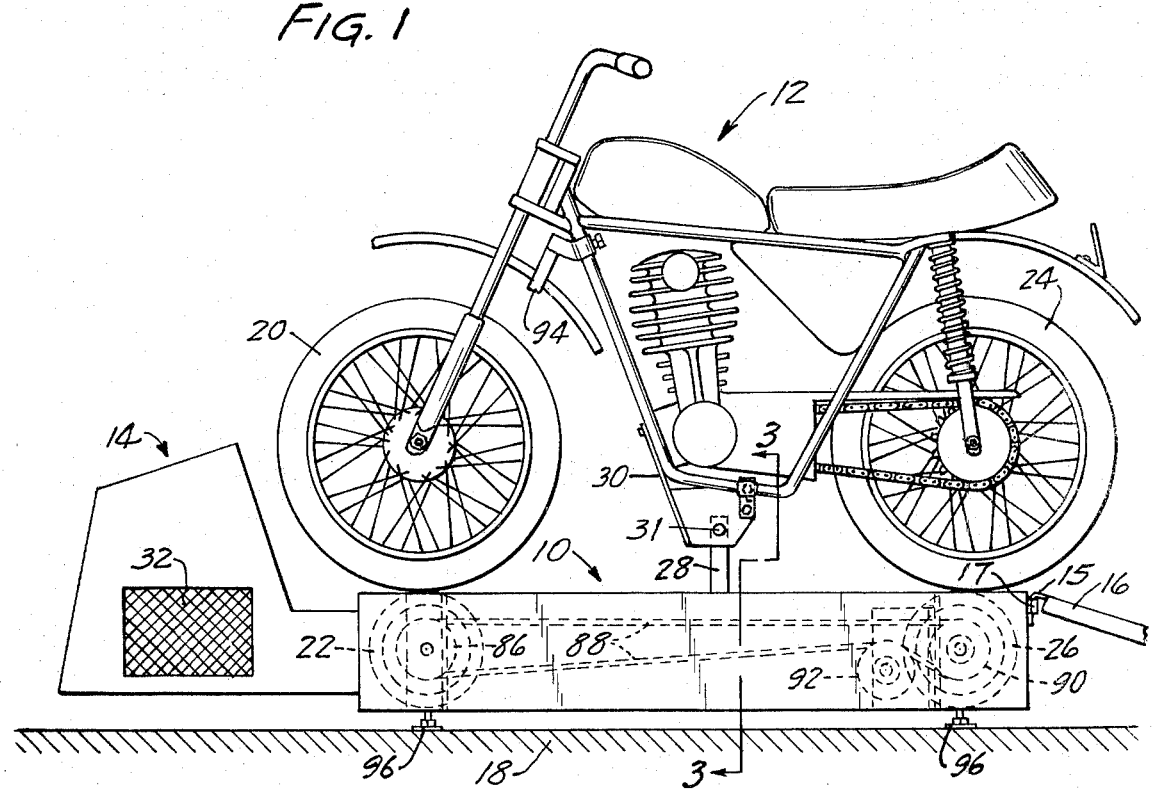
FIG. 1 is a side elevational view of a simulator made in accordance with the invention with the cycle mounted thereon.

With continuing reference to the drawing, and particularly FIG. 1 thereof, the motorcycle riding simulator illustrated therein is designated in entirety by the numeral 10. Mounted on the simulator is a motorcycle 12 of any conventional type. Disposed at the front end of the simulator, and preferably removably attached thereto by any suitable means such as hooks 13, is a blower 14. Removably attached, as by hooks 15 engaged over brackets 17, at the back end of the simulator is a ramp 16 for rolling a cycle onto the simulator. The ramp can be removed once the cycle is on the deck of the simulator. Numeral 18 designates the floor or other supporting surface on which the simulator rests.

Figure 2:
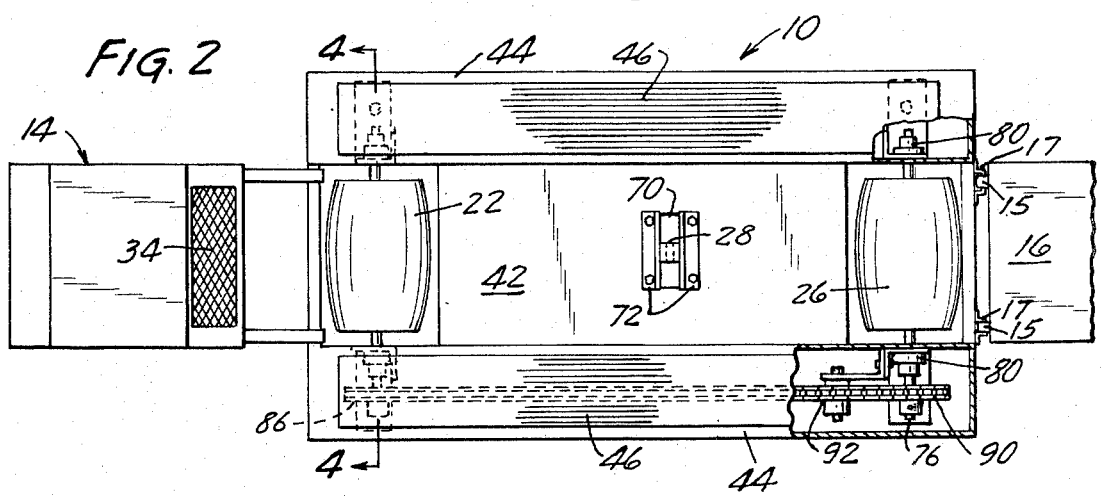
FIG. 2 is a top view of the simulator of FIG. 1 with the upper portion of the cycle supporting post removed and without the cycle thereon.

Turning to FIG. 2, and observing it in conjunction with FIG. 1, it will be seen that the front wheel 20 of the cycle rests on the center of the crown roll 22 toward the forward end of the simulator 10 and the rear wheel 24 of the cycle rests on the center of the crown roll 26 toward the back end of the simulator 10. A supporting post 28 extends upwardly through the housing intermediate the longitudinally spaced parallel crown rolls and has pivotally attached at its upper end, as by pin 31, a mounting bracket 30 which attaches to the central portion of the frame of the motorcycle adjacent the foot rests of the cycle in any convenient manner to support the cycle on the simulator.

The blower 14 consists essentially of a housing or enclosure containing therewithin a suitable kind of blower (not shown), preferably one that can simply be connected to a convenient electrical receptacle. Side screens 32 permit the blower to be ventilated while operating and a front screen 34 directs air from the blower toward the motorcycle engine so that the engine may be maintained reasonably cool while the simulator is in operation.

The simulator 10 in its outward appearance in the form illustrated is a rectangular box-like housing or enclosure, the general shape of which is best illustrated in the cross-sectional views of FIGS. 3 and 4, consisting of upstanding sidewalls 36 and 38 and a top deck or platform 40 having a depressed flat central section 42 running from end to end thereof with raised deck portions 44 flanking the central portion to facilitate mounting and dismounting of the cycle 12 supported on the simulator. A rubber deck pad or the like 46, as shown in FIG. 2, may be put along each raised deck area 44 to prevent slipping to the user of the simulator as he mounts and dismounts the cycle 12.

In FIGS. 3 and 4 the cycle supporting and motion simulating means of the simulator 10 is most clearly shown. In FIG. 3 the center post 28 for supporting the motorcycle is illustrated as being swingably attached by means of a pin or bolt 48 at its lower end to the central portion of a strong supporting beam 50 extending transversely of the simulator. The supporting beam 50 is provided with a central vertical slot 52 in which the pin or bolt 48 fixedly carried by the post 28 at its lower end portion rides so that the post 28 is not only mounted for swinging movement front side to side, but is also capable of vertical movement within the limits of the length of the slot 52.

Brackets 72 extending transversely across the depressed portion 42 of the simulator deck 40 flank the front and rear edges of transverse slot 70 (FIGS. 2 and 3) to prevent swinging movement of the post 28 in direction other than side to side.

Balance adjusting means in the form of elements 54 are provided to maintain the cycle supporting post 28 in a normal upright position and to control swinging movement thereof when a cycle is attached to the cycle attaching bracket 30. As illustrated in FIG. 3, each of the balance adjusting elements 54 comprises a telescoping rod assembly having the lower end 56 thereof pivotally attached to pivot pin 58 secured to the end portion of the transverse supporting beam 50 and the upper end 60 thereof pivotally attached to an intermediate portion of the supporting post 28 by means of a pin or bolt 62. As shown, the elements 54 extend downwardly at approximately a 30° angle from the pivot pin 62 to each of the pivot pins 58 at the outer ends of the beam 50. To control the telescoping movement of the elements 54 each of the elements is wrapped with a fairly heavy coil spring 64, the compression of which is controlled by means of the collars 66 on the lower portions of the elements 54, which collars can be adjustably positioned for different motorcycle weights thereon by means of a suitable set screw 68.

This center post supporting structure is believed unique in a motorcycle simulator and provides great versatility. The post 28 rides up and down in slot 52 and is normally maintained toward the maximum of its vertical extension (FIG. 3) by proper adjustment of extensible and retractable elements 54 for the weight of the cycle thereon. With this arrangement the post arrangement automatically controls downward and swinging movement of the post in accordance with the force applied to the post (the weight of the rider of the cycle).

In FIG. 4 one of the crown rolls 22 is illustrated in more detail. These rolls enable natural leaning and balance simulation as the motorcycle wheel is turned. In the absence of crown rolls, this is not possible. The crown roll construction is simply a metal drum 74 fixedly mounted on a shaft 76 and having a crowned surface formed thereon by means of a hard, 80 durometer or so, natural or synthetic rubber or rubber-like plastic surfacing 78. The ends of the shaft 76 project beyond the roll 22 or 26 and are rotatably journaled in bearings 80 carried by the upright portions 82 of the angle iron supports 84 providing, along with beam 50, the supporting structure of the simulator. One end of the shaft 76 on the forward crown roll 22 projects considerably beyond the bearing 80 and has fixedly mounted thereon a sprocket 86. This sprocket 86 (see particularly FIGS. 1 and 2) is connected by a chain drive 88 to a second sprocket 90 mounted on the shaft 76 of the rear crown roll 26. Idler sprocket 92 mounted on the supporting means adjacent the rear drive sprocket 90 maintains the chain drive 88 to the correct degree of tautness.

In use, the center post and crown roll arrangement provide a road travel simulating action for the motorcycle rider which is unique for such a device. When a cycle 12 is mounted on the simulator 10 as shown in FIG. 1 with the front wheel resting on crown roll 22 and the rear wheel on crown roll 26, the simulator is activated by starting the motorcycle and throwing it into gear. As the rear driving wheel 24 of the cycle causes the rear crown roll 26 to rotate, this rotation is transmitted to the forward crown roll 22 and through this roll to the front wheel 20 of the cycle.

As the front wheel 20 of the cycle is turned, the positioning of the cycle wheels changes from the center toward the side edges of the rolls 22 and 26 causing the bike to lean in accordance with the speed of rotation of the rolls and the degree of the turn. This provides the rider with a close approximation of the actual leaning movement from side to side which one must learn in riding a motorcycle on a road or highway. This unique ability provided by the crown roll-center post structure of this invention familiarizes the rider with the road feel balance to be sought with the cycle around turns at various speeds, in addition to simply familiarizing the rider with the controls as have previous simulators. For safety reasons, a wheel turning limiter 94 is mounted at a convenient location on the motorcycle frame to limit the turning movement of the cycle front wheel and the rolls 22 and 26 have only their upper surfaces projecting above the plane of depressed central portion 42 of the deck 40, projecting upwardly no higher than the raised portion 44 of the deck.

The form of simulator illustrated and described is compact, portable and readily set up and dismantled indoors or outdoors. Adjustable feet 96 depend from the supporting structure of the simulator 10 and provide a means for readily leveling the simulator on uneven surfaces and the simulator ramp and blower can be attached by one possessing the most modest of mechanical skills. Other forms of both portable and stationary simulators may be made if desired and motorcycles of different manufacturers will require different mounting brackets 30; also, the spring loaded extensible and retractable elements 54 can be replaced by other equivalent conventional elements, e.g., fluid controlled adjustable elements. Further, if all of the motion simulating features of the simulator are not desired, the crown rolls may be replaced by conventional cylindrical rolls.

That which is claimed is:

1. A motorcycle riding simulator comprising a supporting structure, crown rolls freely rotatably mounted on said supporting structure in longitudinally spaced parallel relation to one another for engagement with the wheels of a motorcycle, a motorcycle supporting post disposed between said rolls swingably attached at its lower end to said supporting structure for swinging movement in a direction generally parallel to said rolls, said post having means at the top thereof for attachment to a motorcycle between the wheels of the cycle to maintain the cycle in an upright position, means interconnecting said post and said supporting structure to normally maintain said post in an upright position and control swinging movement thereof, and driving means interconnecting said rolls with one another whereby rotation of one of the rolls by the powered wheel of a motorcycle causes the other roll to rotate.

2. A motorcycle riding simulator in accordance with claim 1 wherein means swingably attach said post to said supporting structure to allow said post to move vertically so that the weight of the rider on a motorcycle carried by the simulator is transmitted to the wheels of the cycle rather than to the said post.

3. A motorcycle simulator in accordance with claim 2 wherein said post and supporting structure interconnecting means include downwardly angled extensible and retractable rigid elements pivotally attached at their upper ends to said post intermediate the ends of the post and pivotally attached at their lower ends to said supporting structure at opposite sides of said post in spaced relation thereto, said elements including compressible means normally holding said elements in extended position while permitting controlled retraction thereof in accordance with the force applied to swing said post.

4. A motorcycle riding simulator comprising a supporting structure, rolls freely rotatably mounted on said supporting structure in longitudinally spaced parallel relation to one another for engagement with the wheels of a motorcycle, a motorcycle supporting post disposed between said rolls, means swingably attaching said post at its lower end to said supporting structure for limited movement in a vertical direction and for swinging movement in a direction generally parallel to said rolls, said post having means pivotally mounted at the top thereof for attachment to a motorcycle between the wheels of the cycle to maintain the cycle in an upright position, means interconnecting said post and said supporting structure to normally maintain said post in an upright position toward its maximum vertical extension and to control downward and swinging movement thereof in accordance with the force applied to the post, and driving means interconnecting said rolls with one another whereby rotation of one of the rolls by the powered wheel of a motorcycle causes the other roll to rotate.

5. A simulator in accordance with claim 4 wherein said post and supporting structure interconnecting means include downwardly angled extensible and retractable rigid elements pivotally attached at their upper ends to said post intermediate the ends of the post and pivotally attached at their lower ends to said supporting structure at opposite sides of said post in spaced relation thereto, said elements including compressible means normally holding said elements in extended position while permitting controlled retraction thereof in accordance with the force applied to swing said post.

6. The simulator of claim 4 wherein said rolls are crown rolls.

* * * * *